May 8, 1956    A. L. McCLAIN    2,744,690
SELF-TOWING ATTACHMENT FOR TRACK VEHICLES HAVING GROOVED CLEATS
Filed Dec. 22, 1954
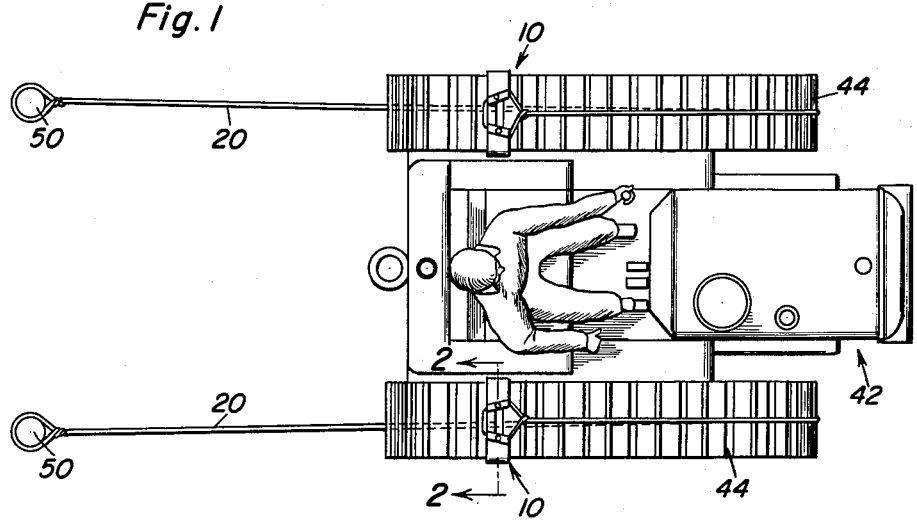
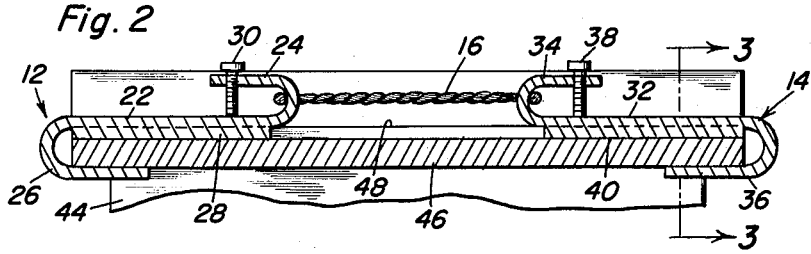
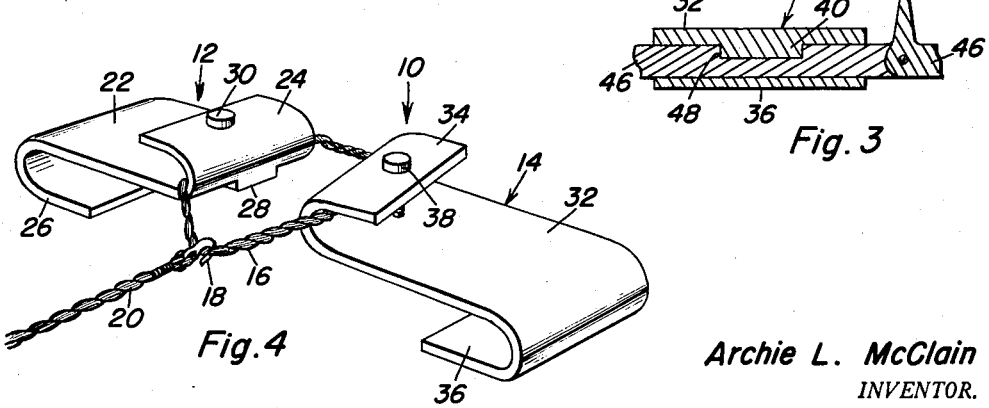
Archie L. McClain
INVENTOR.

United States Patent Office
2,744,690
Patented May 8, 1956

2,744,690

SELF-TOWING ATTACHMENT FOR TRACK VEHICLES HAVING GROOVED CLEATS

Archie L. McClain, Leesville, La.

Application December 22, 1954, Serial No. 477,058

5 Claims. (Cl. 238—14)

This invention relates in general to new and useful improvements in vehicle towing devices, and more specifically to an improved self-towing attachment specifically intended for use in conjunction with track vehicles of the type having cleats with grooves in the outer surfaces thereof.

This invention constitutes an improvement on the form of my invention set forth in my copending application, Serial No. 456,711, filed September 17, 1954.

At the present time, there are available tractors of the track type in which the tracks are formed of cleats having grooves in the outer surfaces thereof. While the grooves are provided for other functions, it has been found that there may be quickly attached thereto an attachment which may include a tow cable so that when the vehicle becomes struck in loose ground or mud, it may readily tow itself from such ground by attaching the tow cables to a fixed object, such as a tree or the like.

Another object of this invention is to provide an improved self-towing device which is of such a nature whereby it may be conveniently secured to cleats of a track vehicle without the use of any fastening means whatsoever.

Another object of this invention is to provide an improved self-towing device which is of such a nature whereby it may be conveniently secured to a track of a track vehicle and may utilize the slipping movement of the track with respect to the soft ground in which it is stuck so as to tighten a tow cable of the device and thereby extricate itself.

A further object of this invention is to provide an improved self-towing attachment for track vehicles, the attachment being extremely small as compared to the track and being of such a nature whereby it may be conveniently stored in the tool box of the vehicle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view of a track vehicle employing the present invention in order to extricate itself from soft ground;

Figure 2 is an enlarged fragmentary transverse vertical sectional view taken substantially upon the plane indicated by the section line 2—2 of Figure 1 and shows the general relationship of S-shaped members of the attachment with respect to a cleat of the track;

Figure 3 is an enlarged fragmentary vertical sectional view taken substantially upon the plane indicated by the section line 3—3 of Figure 2 and shows the relationship between the grooved cleat and a projecting rib of one of the S-shaped members; and Figure 4 is an enlarged perspective view of the self-towing attachment and shows the general details thereof.

Referring now to the drawings in detail, it will be seen that there is best illustrated in Figure 4 the self-towing attachment which is the subject of this invention, the attachment being referred to in general by the reference numeral 10. The attachment 10 includes a pair of S-shaped members 12 and 14 which are connected together by a flexible loop 16 to which is attached a hook 18 of a tow cable 20.

The S-shaped member 12 includes an elongated intermediate portion 22 which has formed at one end thereof a hook portion 24. The hook portion 24 faces outwardly and is disposed at a slight angle to the axis of the elongated portion 22. Formed at the other end of the elongated portion 22 and underlying the same is a hook portion 26. The hook portion 26 opens inwardly and is intended to be received over an edge of a track cleat in a manner to be described in more detail hereinafter. Projecting downwardly from the central part of the intermediate portion 22 is an elongated rib 28. The hook portion 24 also includes a removable fastener 30 for retaining the ring 16 in place.

The S-shaped member 14 is identical with the S-shaped member 12 with the exception that the S-shaped member 14 may be considered a right hand member whereas the S-shaped member 12 may be considered a left hand member. The S-shaped member 14 includes an elongated intermediate portion 32 which has formed integral with one end thereof an overlying hook portion 34 which opens outwardly. Formed integral with the opposite end of the elongated portion 32 is an underlying hook portion 36 which opens inwardly. Like the hook portion 24, the hook portion 34 is disposed at an angle to the axis of the elongated portion 32. The hook portion 34 is provided with a removable fastener 38 for retaining the ring 16 in place, and the elongated portion 32 is provided with a downwardly projecting rib 40 which is best illustrated in Figure 2.

It is to be noted that the hook portions 24 and 34 are so related that they diverge in the direction of pull on the tow cable 20. In this manner, the S-shaped members 12 and 14 are urged together to retain them in their proper positions.

Referring now to Figure 1 in particular, it will be seen that there is illustrated a conventional type of tractor which is referred to in general by the reference numeral 42. The tractor 42 is provided with suitable tracks 44. As is best illustrated in Figure 2, each of the tracks 44 is formed of a plurality of cleats 46 which are provided with transversely extending grooves 48 in the upper surface thereof.

When the tractor 42 becomes stuck in soft ground, it may be extricated by attaching one of the attachments 10 to at least one of the tracks 44. This is accomplished by merely sliding the S-shaped members 12 and 14 over one of the cleats 46. It will be noted that the hook portions 26 and 36 have received therein edges of the one cleat 46. At the same time, the depending ribs 28 and 40 are received in opposite ends of the recess 48. In this manner, longitudinal movement of the S-shaped members 12 and 14 relative to the cleat 46 is prevented. Inasmuch as the S-shaped members 12 and 14 are urged towards each other by the action of the ring 16, it will be readily apparent that the S-shaped members 12 and 14 are retained on the cleat 46 without the need of any fastening means.

Referring once again to Figure 1 in particular, it will be seen that there is attached to each of the tracks 44 one of the attachments 10. The tow cables of the attachments 10 pass over the tracks 44 and down under, and their opposite ends are connected to suitable trees 50. It is to be understood that other types of deadmen may be utilized. The tractor 42 is now so attached to the trees 50 so that when the tracks 40 are moved in reverse, the tow cables 20 are reeled thereon and the tractor 42 tows itself rearwardly until such time as the tracks 44 engage sufficiently hard ground so that the tracks may pull themselves.

From the foregoing, it will be readily apparent that there has been devised a self-towing attachment which may be readily secured to tracks of the type being provided with grooved cleats for towing vehicles provided with such tracks when stuck and that the attachments may be secured in place without the use of any wrenches or fastening means.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A self-towing device for track vehicles of the type having cleats with grooves in the outer surfaces thereof, said self-towing device comprising a pair of generally S-shaped members each including an elongated intermediate portion, and oppositely facing hook portions, one of said hook portions being adapted to engage over a cleat, said intermediate portion having formed on the surface thereof facing said one hook portion a projecting rib of a size of be received in the groove of the cleat, the other of the hook portions being engaged by a tow cable.

2. A self-towing device for track vehicles of the type having cleats with grooves in the outer surfaces thereof, said self-towing device comprising a pair of generally S-shaped members each including an elongated intermediate portion, and oppositely facing hook portions, one of said hook portions being adapted to engage over a cleat, said intermediate portion having formed on the surface thereof facing said one hook portion a projecting rib of a size to be received in the groove of the cleat, the other of the hook portions being engaged by a tow cable, removable retaining means carried by said other hook portion for retaining said tow cable in engagement therewith.

3. A self-towing device for track vehicles of the type having cleats with grooves in the outer surfaces thereof, said self-towing device comprising a pair of generally S-shaped members each including an elongated intermediate portion, and oppositely facing hook portions, one of said hook portions being adapted to engage over a cleat, said intermediate portion having formed on the surface thereof facing said one hook portion a projecting rib of a size to be received in the groove of the cleat, the other of the hook portions being engaged by a tow cable, said other hook portions being in adjacent opposed relation.

4. A self-towing device for track vehicles of the type having cleats with grooves in the outer surfaces thereof, said self-towing device comprising a pair of generally S-shaped members each including an elongated intermediate portion, and oppositely facing hook portions, one of said hook portions being adapted to engage over a cleat, said intermediate portion having formed on the surface thereof facing said one hook portion a projecting rib of a size to be received in the groove of the cleat, the other of the hook portions being engaged by a tow cable, said other hook portion diverging in the direction of pull on said tow cable.

5. A self-towing device for track vehicles of the type having cleats with grooves in the outer surfaces thereof, said self-towing device comprising a pair of generally S-shaped members each including an elongated intermediate portion, and oppositely facing hook portions, one of said hook portions being adapted to engage over a cleat, said intermediate portion having formed on the surface thereof facing said one hook portion a projecting rib of a size to be received in the groove of the cleat, the other of the hook portions being engaged by a tow cable, said S-shaped members being of a left and right relation.

References Cited in the file of this patent

UNITED STATES PATENTS

| | | |
|---|---|---|
| 1,096,606 | Delano | May 12, 1914 |
| 1,718,509 | West | June 25, 1929 |
| 2,479,748 | Lassila | Aug. 23, 1949 |